(12) United States Patent
Nakanishi et al.

(10) Patent No.: US 7,122,660 B1
(45) Date of Patent: Oct. 17, 2006

(54) CELLULOSE ACETATE AND DOPE CONTAINING THE SAME

(75) Inventors: Yukiko Nakanishi, Akashi (JP); Hiroki Taniguchi, Himeji (JP); Katako Ueda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/145,987

(22) Filed: Sep. 3, 1998

(30) Foreign Application Priority Data

Mar. 17, 1998 (JP) .................................. 10/066501

(51) Int. Cl.
*C08B 3/06* (2006.01)
(52) U.S. Cl. ........................... 536/69; 536/63; 536/64; 536/65; 536/68
(58) Field of Classification Search ................. 536/63, 536/64, 65, 68, 69
See application file for complete search history.

(56) References Cited

U.S. PATENT DOCUMENTS

| | | | |
|---|---|---|---|
| 2,582,049 A | * | 1/1952 | Malm et al. |
| 3,673,084 A | | 6/1972 | King et al. ................... 210/23 |
| 3,755,297 A | * | 8/1973 | Campbell et al. ............. 536/76 |
| 3,816,150 A | * | 6/1974 | Ishii et al. ................... 106/194 |
| 3,952,081 A | * | 4/1976 | Epstein et al. ............... 264/207 |
| 4,426,481 A | * | 1/1984 | Sullivan |
| 4,888,147 A | * | 12/1989 | Mochida et al. |
| 5,152,947 A | * | 10/1992 | Takeda et al. |
| 5,240,665 A | * | 8/1993 | Seo et al. ................... 264/169 |
| 5,804,296 A | * | 9/1998 | Itoh et al. ................... 428/326 |
| 5,914,397 A | * | 6/1999 | Kiyose et al. ................. 536/71 |

FOREIGN PATENT DOCUMENTS

| | | | |
|---|---|---|---|
| EP | 0311103 | | 4/1989 |
| EP | 0952160 | | 10/1999 |
| GB | 350310 | | 6/1931 |
| GB | 1102976 A | * | 2/1968 |
| GB | 2101136 | * | 1/1983 |
| JP | 57182737 | | 10/1982 |
| JP | 2-251607 | * | 10/1990 |
| JP | 06-049275 | | 2/1994 |
| WO | WO 96/30412 | * | 10/1996 |

OTHER PUBLICATIONS

English translation of JP 2-251607, (translated Jun. 2004).*
Patent Abstracts of Japan, vol. 14, No. 578 (C-0791), Dec. 21, 1990, Publication No. 02251607, Publication Date Sep. 10, 1990.
Patent Abstracts of Japan, vol. 4, No. 42 (C-005), Apr. 3, 1980, Publication No. 55016062, Publication Date Apr. 2, 1980.

* cited by examiner

*Primary Examiner*—Leigh C. Maier
(74) *Attorney, Agent, or Firm*—Birch, Stewart, Kolasch & Birch, LLP

(57) ABSTRACT

Using the dope containing the following cellulose acetate (1), (2), or (3), a film is prepared by the casting process:
(1) a cellulose acetate having carboxyl groups binding to at least one member selected from the group consisting of a cellulose acetate and a hemicellulose acetate, wherein at least a part of said carboxyl groups are in an acidic form;
(2) a cellulose acetate containing at least one member selected from the group consisting of an acid having an acid dissociation exponent pKa of 1.93 to 4.50 in water, an alkali metal salt of said acid and an alkaline earth metal of said acid; or
(3) a cellulose acetate containing an alkali metal or an alkaline earth metal wherein the total content of an alkali metal and an alkaline earth metal in 1 gram of the cellulose acetate is from an effective amount to $5.5 \times 10^{-6}$ equivalent (in terms of ion equivalent). The above cellulose acetate is also useful for spinning process. The cellulose acetate includes a cellulose diacetate and a cellulose triacetate. The cellulose acetate of the present invention has high film-releasability from a support and excellent optical characteristics.

12 Claims, No Drawings

CELLULOSE ACETATE AND DOPE CONTAINING THE SAME

FIELD OF THE INVENTION

This invention relates to a cellulose acetate useful for the production of films (polarlizer protective films, color filters, films for photosensitive materials) and fibers, and a dope containing the same.

BACKGROUND OF THE INVENTION

Cellulose triacetate film is tough and has good dimensional stability, heat resistance, and optical isotropy. Therefore, it has been used in various applications such as a substrate for optical thin-film devices (e.g. a substrate for photosensitive materials), a polarlizer protective film (e.g. liquid crystal protective film) for liquid crystal devices, and color filters. Therefore, cellulose triacetate film is required to have satisfactory optical characteristics, for example, low yellowness index, haze, and birefringence and high transparency. When a solution (dope) containing cellulose acetate such as cellulose diacetate and a solvent is used in the production of fibers, it is required to have high spinnability.

To assure satisfactory optical characteristics, the cellulose acetate film is generally produced by the technology which comprises acetylating a linter pulp, a softwood pulp or a hardwood pulp, casting a solution (dope) containing the resulting cellulose acetate and a solvent on a support, and releasing the resulting film from the support.

However, when a linter pulp is used, the cost of the cellulose acetate is inevitably high. Moreover, when a high-purity softwood pulp among softwood pulps is used, there is a problem with steady supply of a raw material. When a low-purity softwood pulp is used, a transparency of a cellulose acetate tends to decrease. On the other hand, a hardwood pulp generally is advantageous cost-wise but is not satisfactory in the releasability of the cast film from the support so that it is difficult to attain a satisfactory surface smoothness and sufficiently high productivity. Furthermore, a cellulose acetate obtained from a low-purity pulp injures the stability of its dope or filterability and thus lowers the spinnability.

SUMMARY OF THE INVENTION

It is, therefore, an object of the present invention to provide a cellulose acetate which insures good releasability from a support in a casting process, and a dope containing the same.

It is another object to provide a cellulose acetate with high releasability in a casting process as well as satisfactory optical properties, and a dope containing the same.

A further object of the invention is to provide a cellulose acetate with a high spinnability in the production of fibers with use of its dope, and a dope containing the same.

It is yet another object of the invention to provide a cellulose acetate with high releasability, excellent optical properties and spinnability as well as good heat resistance.

To accomplish the above objects, the inventors of the present invention did much research and found that (I) the form of the carboxyl group binding to a cellulose acetate and/or hemicellulose acetate or (II) the content of an alkali metal or an alkaline earth metal in a cellulose acetate remarkably affects releasability and transparency of a film or spinnability of a dope. The present invention has been accomplished based on the above findings.

Thus, the cellulose acetate of the present invention includes (1) a cellulose acetate wherein at least a part of carboxyl groups binding to a cellulose acetate and/or hemicellulose acetate are in the form of an acid (an acidic form), (2) a cellulose acetate containing at least one member selected from an acid having an acid dissociation exponent pKa of 1.93 to 4.50 in water, an alkaline metal salt of the acid and an alkaline earth metal salt of the acid, and (3) a cellulose acetate wherein the total content of an alkaline metal and an alkaline earth metal in 1 gram (1 g) of the cellulose acetate is from an effective amount to $5.5 \times 10^{-6}$ equivalent (in terms of ion equivalent).

Moreover, the cellulose acetate of the present invention includes a cellulose acetate combinationally having two or more features or characteristics selected from the above features or characteristics (1), (2) and (3).

The present invention discloses the method of producing the above cellulose acetates.

Further, the present invention includes a cellulose acetate which is given heat resistance by adjusting the slurry pH to 4.5 to 6.0 with use of the acid or salts thereof.

A dope of the present invention contains at least one cellulose acetate among the cellulose acetates mentioned above. Moreover, the dope of the present invention includes a dope containing (a) a cellulose acetate, and (b) at least one member selected from an acid having a acid dissociation exponent pKa of 1.93 to 4.50 in water, an alkaline metal salt of the acid and an alkaline earth metal salt of the acid.

Furthermore, the present invention includes a method for improving a releasability of a film from a support or a spinnability in the production of fibers, by using the above dope.

Incidentally, in the case of a multistage-dissociative acid, the acid dissociation exponent pKa is different according to a dissociation stage. In the specification, the meaning of "the acid dissociation exponent pKa of 1.93 to 4.50" is that the acid dissociation exponent pKa at least in the first stage (the dissociation stage 1) is the range of 1.93 to 4.50.

DETAILED DESCRIPTION OF THE INVENTION

A cellulose acetate of the present invention can be produced by acetylating a pulp. The species of the pulp is not particularly limited, and may be used various pulps. Typically, at least one pulp selected from a wood pulp (e.g., a hardwood pulp and a softwood pulp) and a linter pulp may be used, and the wood pulp and the linter pulp may be combinatorially used. The content of α-cellulose, which is an indicator of purity of a pulp, may be selected within the range of, for example, about 90 to 100% by weight, and practically about 92 to 98% by weight in a wood pulp. According to the present invention, a low-purity pulp such as a pulp having an α-cellulose content of about 90 to 97% by weight (in particular about 92 to 96% by weight) may be used. Among these pulps, the wood pulp is practically used. As described above, a cellulose acetate produced by using a hardwood pulp as a raw material is generally inferior in releasability of a film in the casting process, and a cellulose acetate produced by using a softwood pulp as a raw material is inferior in optical characteristics such as transparency, or spinnability. The present invention can improve releasability of a cellulose acetate film, optical characters such as transparency and spinnability of a cellulose acetate in spite of using the wood pulp as a raw material.

The cellulose acetate can be produced by the conventional production technology, for example, the process using sulfuric acid as a catalyst, the acetic acid process, and the methylene chloride process. The cellulose acetate is usually produced by treating a starting pulp (cellulose) with acetic acid or the like (activation step), acetylating the same with acetic anhydride in the presence of the sulfuric acid catalyst to give a cellulose triacetate (acetylation step), and hydrolyzing or aging the triacetate to adjust its degree of acetylation (saponification step, or ripening or aging step).

In this process, the activation step can be carried out by spraying a mist of acetic acid or aqueous acetic acid on the pulp (cellulose) or by dipping the pulp in an acetic acid or aqueous acetic acid bath. The amount of acetic acid relative to 100 parts by weight of the pulp (cellulose) is about 10 to 100 parts by weight, preferably about 20 to 80 parts by weight, and more preferably about 30 to 60 parts by weight.

The amount of acetic anhydride to be used in the acetylation step can be selected from a range conducive to the above-mentioned degree of acetylation. Thus, based on 100 parts by weight of the pulp (cellulose), the amount of acetic anhydride may for example be about 230 to 300 parts by weight, preferably about 240 to 290 parts by weight, and more preferably about 250 to 280 parts by weight.

In the acetylation step, acetic acid is generally used as the solvent. The amount of acetic acid to be used for this purpose may for example be about 200 to 700 parts by weight, preferably about 300 to 600 parts by weight, and more preferably about 350 to 500 parts by weight per 100 parts by weight of the pulp (cellulose).

As a catalyst for acetylation or aging (ripening), sulfuric acid is usually used. The amount of sulfuric acid relative to 100 parts by weight of cellulose is generally about 1 to 15 parts by weight, preferably about 5 to 15 parts by weight, and more preferably about 5 to 10 parts by weight. The saponification step or aging (or ripening) step can be carried out, for example, at a temperature of about 50 to 70° C.

In order to improve the optical characteristics of a cellulose acetate, treatment of a cellulose acetate with an oxidizing agent may be conducted in a suitable stage of production, for example, after the acetylation reaction or after the saponification (hydrolysis) reaction or aging. The oxidizing agent includes, but is not limited to, hydrogen peroxide; peracids such as performic acid, peracetic acid and perbenzoic acid; and organic peroxides such as diacetyl peroxide and so forth. The oxidizing agents can be used singly or in combination. The preferred oxidizing agent is one which can be easily removed from the cellulose acetate without leaving any appreciable residues, thus including hydrogen peroxide, performic acid and peracetic acid. Particularly preferred are hydrogen peroxide and peracetic acid. The amount of the oxidizing agent can be selected according to the required optical parameter levels and, based on 100 parts by weight of cellulose acetate, may for example be about 0.01 to 5 parts by weight, preferably about 0.1 to 2.5 parts by weight, and particularly about 0.1 to 1 parts by weight.

The treatment with the oxidizing agent can be carried out at a temperature suited to the oxidizing agent, for example, about 20 to 100° C., and preferably about 30 to 70° C.

The average degree of acetylation of a cellulose acetate may be selected within the range of about 30 to 62.5% in accordance with applications or characteristics. Cellulose diacetate or cellulose triacetate is usually advantageous for commercial production. The average degree of acetylation of a cellulose acetate is, for example, about 43.7 to 62.5% (the average degree of substitution of an acetyl group: about 1.7 to 3.0), preferably about 45 to 62.5% (the average degree of substitution: about 1.8 to 3.0) and more preferably about 48 to 62.5% (the average degree of substitution: 2.0 to 3.0).

In a cellulose triacetate, the average degree of acetylation is, for example, about 58 to 62.5%, preferably about 58.5 to 62% and more preferably about 59 to 62% (e.g., about 60 to 61%) for improved dimentional stability, moisture resistance and heat resistance.

The degree of acetylation represents the amount of acetic acid bound and is the weight percentage of bound acetic acid per weight of cellulose unit. The degree of acetylation can be determined in accordance with the procedure for determination of the degree of acetylation as set forth in ASTM D-817-91 (test methods for cellulose acetate etc.). The test protocol is as follows. Weigh exactly 1.9 g of cellulose acetate, previously dried, dissolve in 150 ml of a mixture of acetone-dimethyl sulfoxide (4:1, v/v), add 30 ml of an aqueous 1N-sodium hydroxide solution, and saponify at 25° C. for 2 hours. Add phenolphthalein as an indicator and titrate the excess sodium hydroxide with 1N-sulfuric acid (concentration factor: F). Perform a blank test in the same manner and calculate the degree of acetylation by means of the following equation.

$$\text{Degree of acetylation}(\%)=[6.5\times(B-A)\times F]/W$$

wherein A represents an amount of 1N-sulfuric acid (ml) added to the sample, B represents an amount of 1N-sulfuric acid (ml) added to blank, F shows a concentration factor of 1N-sulfuric acid, and W is a weight of the sample.

The degree of polymerization of cellulose acetate, in terms of viscosity average degree of polymerization, is about 200 to 400, preferably about 250 to 400, and more preferably about 270 to 400 (e.g., about 290 to 400). Usually, the viscosity average degree of polymerization is about 270 to 350.

The average degree of polymerization can be determined by the intrinsic viscosity method of Uda et al. (Kazuo Uda & Hideo Saito: Journal of the Society of Fiber Science and Technology, Japan, Vol. 18, No. 1, 105–120, 1962). In the method, a solvent may be selected according to the degree of acetylation of a cellulose acetate. For example, in the case of a cellulose triacetate, the test protocol is as follows.

Dissolve cellulose triacetate in a mixture of methylene chloride-methanol (9:1, by weight) at a predetermined concentration c (2.00 g/L). Then, inject the solution into an Ostward viscosimeter and measure the flow time (in seconds) t of the solution between the viscosimeter graduations at 25° C. On the other hand, measure the blank flow time (in seconds) $t_0$ with the above solvent mixture and calculate the viscosity average degree of polymerization by means of the following formula.

$$\eta_{rel}=t/t_0$$

$$[\eta]=(\ln\eta_{rel})/c$$

$$DP=[\eta]/(6\times10^{-4})$$

wherein t shows a flow time (in seconds) of the solution, $t_0$ shows a flow time (in seconds) of the solvent, c represents a cellulose triacetate concentration of the solution (g/L), $\eta$rel represents a relative viscosity, $[\eta]$ is an intrinsic viscosity, and DP is an average degree of polymerization.

When methylene chloride-methanol=9/1 (by weight) is used as the solvent mixture, for instance, the viscosity of a 6 weight % solution of cellulose triacetate may for example be about 200 to 700 mPa·s, preferably about 250 to 600 mPa·s, and particularly about 250 to 500 mPa·s.

For enhanced stability, such cellulose acetate contains a heat stabilizer such as an alkali metal (e.g., lithium, potassium, sodium), a salt or a compound thereof, and an alkaline earth metal (e.g., calcium, magnesium, strontium, barium), a salt or a compound thereof.

The cellulose acetate of the present invention is mainly classified into the following three series or embodiments (1), (2) and (3):

(1) a cellulose acetate wherein at least a part of carboxyl groups binding to a cellulose acetate and/or hemicellulose acetate are in an acidic form (i.e., the cellulose acetate having free carboxyl groups);

(2) a cellulose acetate containing at least one member selected from an acid having a acid dissociation exponent pKa of 1.93 to 4.50 in water, an alkali metal salt of the acid and an alkaline earth metal salt of the acid; and (3) a cellulose acetate wherein the total content of an alkali metal and an alkaline earth metal in 1 gram (1 g) of the cellulose acetate is from an effective amount to $5.5 \times 10^{-6}$ equivalent (in terms of ion equivalent).

Moreover, the cellulose acetate of the present invention includes the following cellulose acetates (4), (5), (6) and (7) selected from the combinations of the above series or embodiments (1) and (2), (1) and (3), (2) and (3), and (1), (2) and (3).

(4) a combination of (1) and (2) mentioned above, i.e. a cellulose acetate containing (2) at least one member selected from an acid having an acid dissociation exponent pKa of 1.93 to 4.50 in water, an alkaline metal salt of the acid and an alkaline earth metal salt of the acid, and wherein (1) at least a part of carboxyl groups binding to a cellulose acetate and/or hemicellulose acetate are in the form of an acid.

(5) a combination of (1) and (3), i.e. a cellulose acetate (3) wherein the total content of an alkaline metal and an alkaline earth metal in 1 gram of the cellulose acetate is from an effective amount to $5.5 \times 10^{-6}$ equivalent (in terms of ion equivalent), and (1) at least a part of carboxyl groups binding to a cellulose acetate and/or hemicellulose acetate are in the form of an acid.

(6) a combination of (2) and (3), i.e. a cellulose acetate containing (2) at least one member selected from an acid having an acid dissociation exponent pKa of 1.93 to 4.50 in water, an alkaline metal salt of the acid and an alkaline earth metal salt of the acid, and wherein (3) the total content of an alkaline metal and an alkaline earth metal in 1 gram of the cellulose acetate is from an effective amount to $5.5 \times 10^{-6}$ equivalent (in terms of ion equivalent).

(7) a combination of (1), (2) and (3), i.e. a cellulose acetate containing (2) at least one member selected from an acid having an acid dissociation exponent pKa of 1.93 to 4.50 in water, an alkali metal salt of the acid and an alkaline earth metal salt of the acid, wherein (3) the total content of an alkaline metal and an alkaline earth metal in 1 gram of the cellulose acetate is from an effective amount to $5.5 \times 10^{-6}$ equivalent (in terms of ion equivalent), and (1) at least a part of carboxyl groups binding to a cellulose acetate and/or hemicellulose acetate are in the form of an acid.

[The cellulose acetates of the embodiments (1), (4), (5) and (7)]

In the cellulose acetates of the embodiments (1), (4), (5) and (7), at least apart of carboxyl groups binding to a cellulose acetate and/or hemicellulose acetate are in the form of a free acid, and all of the carboxyl groups do not form a metal salt (e.g., the alkali metal salt or an alkaline earth metal salt of a carboxyl group). In the preferred cellulose acetate, the total carboxyl groups bound to a cellulose acetate and/or hemicellulose acetate contains at least about 30 mole %, preferably about 50 to 100 mole % and practically about 70 to 100 mole % of a free carboxyl group in the carboxyl groups.

[The cellulose acetates of the embodiments (2), (4), (6) and (7)]

In the cellulose acetates of the embodiments (2), (4), (6) and (7), an acid having an acid dissociation exponent pKa of 1.93 to 4.50 [preferable about 2.0 to 4.4, more preferably about 2.2 to 4.3 (e.g., about 2.5 to 4.0) and practically about 2.6 to 4.3 (e.g., about 2.6 to 4.0)]includes an inorganic acid and an organic acid. As pKa value of an acid, see "Chemical Handbook third revised edition, the basic chapter II" (edited by Japanese Chemical, published by Maruzen; Japan). Examples of the acid and the acid dissociation exponent pKa in parentheses are represented as follows.

The inorganic acid includes, for example, $HClO_2$ (2.31), HOCN (3.48), molybdric acid ($H_2MoO_4$:3.62), $HNO_2$ (3.15), phosphoric acid ($H_3PO_4$:2.15), tripolyphosphoric acid ($H_5P_3O_{10}$:2.0) and vanadic acid ($H_3VO_4$:3.78).

Examples of the organic acid include an aliphatic monocarboxylic acid [e.g., formic acid (3.55); an acetic acid having a substituent such as oxalacetic acid (2.27), cyanoacetic acid (2.47), phenylacetic acid (4.10), phenoxyacetic acid (2.99), fluoroacetic acid (2.59), chloroacetic acid (2.68), bromoacetic acid (2.72), iodoacetic acid (2.98), mercaptoacetic acid (3.43) and vinylacetic acid(4.12); a halopropionic acid such as chloropropionic acid (2.71 to 3.92); 4-aminobutanoic acid (4.03); acrylic acid (4.26)], an aliphatic polycarboxylic acid [e.g., malonic acid (2.65), succinic acid (4.00), glutalic acid (4.13), adipic acid (4.26), pimelic acid (4.31), azelaic acid (4.39), fumaric acid (2.85)], a hydroxycarboxylic acid [e.g., glycollic acid (3.63), lactic acid (3.66), malic acid (3.24), tartaric acid (2.82 to 2.99), citric acid (2.87)], an aldehyde acid or a ketone acid [e.g., glyoxylic acid (3.18), pyruvic acid (2.26), levulinic acid (4.44)], an aromatic monocarboxylic acid [e.g., anilinesulfonic, acid (3.74 to 3.23); benzoic acid (4.20); a benzoic acid having a substituent such as aminobenzoic acid (2.02 to 3.12), chlorobenzoic acid (2.92 to 3.99), cyanobenzoic acid (3.60 to 3.55), nitrobenzoic acid (2.17 to 3.45), hydroxybenzoic acid (4.08 to 4.58), anisic acid (4.09 to 4.48), fluorobenzoic acid (3.27 to 4.14), chlorobenzoic acid, bromobenzoic acid (2.85 to 4.00) and iodobenzoic acid (2.86 to 4.00); salicylic acid (2.81); naphtoic acid (3.70 to 4.16); cinnamic acid (3.88); mandelic acid (3.19)], an aromatic polycarboxylic acid [e.g., phtalic acid (2.75), isophtalic acid (3.50), terephyhalic acid (3.54)], a heterocyclic monocarboxylic acid [e.g., nicotinic acid (2.05), 2-furancarboxylic acid (2.97)], and a heterocyclic polycarboxylic acid [e.g., 2.6-pyridinedicarboxylic acid (2.09)].

The organic acid includes amino acids [i.e., an amino acid or derivative thereof (e.g., an amino acid having a substituent, a peptide composed of about 2 to 5 amino acids).

The group of an amino acid includes, for example, an amino acid [e.g., asparagine (2.14), aspartic acid (1.93), adenine (4.07), alanine (2.30), β-alanine (3.53), arginine (2.05), isoleucine (2.32), glycine (2.36), glutamine (2.17), glutamic acid (2.18), serine (2.13), tyrosine (2.17), tryptophan (2.35), threonine (2.21), norleucine (2.30), valine (2.26), phenylalanine (2.26), methionine (2.15), lysine (2.04), leucine (2.35)], an amino acid derivative [e.g., adenosine (3.50), adenosine triphosphate (4.06), adenosine monophosphate (3.65 to 3.80), L-alanyl-L-alanine (3.20), L-alanylglycine (3.10), β-alanylglycine (3.18), L-alanylglycylglycine (3.24), β-alanylglycylglycine (3.19), L-alanylglycylglycylglycne, (3.18), glycyl-L-alanine (3.07), glycyl- β-alanine (3.91), glycylglycyl-L-alanine (3.18), glycylglycylglycine (3.20), glycylglycylglycylglycine (3.18), glycylglycyl-L-histidine (2.72), glycylglycylglycyl-L-histidine (2.90), glycyl-DL-histidylglycine (3.26), glycyl-L-histidine (2.54), gly-cyl-L-leucine (3.09), γ-L-glutamyl-L-cysteinylglycine (2.03), N-methylglycine (sarcosine, 2.20), N,N-dimethylglycine (2.08), citrulline (2.43), 3,4-dihydroxyphenylalanine (2.31), L-hystidylglycine (2.84), L-phenylalanylglycine (3.02), L-prorylglicine (3.07), L-leuciyl-L-tyrosine (3.15)].

As an acid, an organic acid such as an aliphatic monocarboxylic acid [e.g., formic acid, a haloacetic acid such as chloroacetic acid, a saturated or unsaturated $C_{1-3}$monocarboxylic acid such as a halopropionic acid and acrylic acid], an aliphatic polycarboxylic acid [e.g., a saturated or unsaturated $C_{2-4}$dicarboxylic acid such as malonic acid, succinic acid, glutalic acid and fumaric acid], a hydroxycarboxylic acid [e.g., $C_{1-6}$hydroxycarboxylic acid such as glycollic acid, lactic acid, malic acid, tartaric acid and citric acid], and an amino acid or derivative thereof is practically used.

These acids may be water-insoluble or water-soluble.

The acid may be used in the form of a free acid, or alkali metal salt or alkaline earth metal salt. The alkali metal includes, for example, lithium, potassium and sodium. The alkaline earth metal includes, for example, calcium, magnesium, barium and strontium. The preferred alkali metal includes sodium, and the preferred alkaline earth metal includes calcium and magnesium. Each of these alkali metals and alkaline earth metals may be used singly or in combination of two or more. A combination of the alkali metal and the alkaline earth metal may be used.

The total content of the acid and metal salt thereof may be selected within the range not interfering with releasability, transparency or spinnability, and may be about $1 \times 10^{-9}$ to $3 \times 10^{-5}$ mole, preferably about $1 \times 10^{-8}$ to $2 \times 10^{-5}$ mole (e.g., about $5 \times 10^{-7}$ to $1.5 \times 10^{-5}$ mole), more preferably about $1 \times 10^{-7}$ to $1 \times 10^{-5}$ mole (e.g., about $5 \times 10^{-6}$ to $8 \times 10^{-6}$ mole), and practically about $5 \times 10^{-7}$ to $5 \times 10^{-6}$ mole (e.g., about $6 \times 10^{-7}$ to $3 \times 10^{-6}$ mole) per 1 g (gram) of a cellulose acetate.

Incidentally, the content of the acid and metal salt thereof in a cellulose acetate may be quantitated as follows.

[Ion Chromatography Analysis]

A dried cellulose acetate (2.0 g) in the form of minute powder is precisely weighed. To the cellulose acetate, 80 ml of heated water is added and the resulting mixture is stirred and sealed. After standing over night, the mixture is further stirred and precipitated. As the sample solution, about 10 ml of supernatant is obtained. The content of the acid and the metal salt thereof is measured by ion chromatography.

[The Cellulose Acetates of the Embodiments (3), (5), (6) and (7)]

In the cellulose acetates of the embodiments (3), (5), (6) and (7), the total content of an alkali metal and an alkaline earth metal in 1 gram (1 g) of the cellulose acetate is decreased in order to improve releasability of a film in the casting process, transparency and spinnability.

An alkali metal and an alkaline earth metal include an alkali metal and an alkaline earth metal similar to those exemplified above. A cellulose acetate may contain either of an alkali metal or alkaline earth metal, or may contain both an alkali metal and alkaline earth metal.

When the content of an alkali metal or alkaline earth metal is low, the alkali metal and/or alkaline earth metal may be bound to an acidic group (e.g. a carboxyl group, sulfonic acid group) of cellulose acetate. The total content of an alkali metal and alkaline earth metal in 1 gram of a cellulose acetate may be effective amount or more not interfering with heat resistance of the cellulose acetate, and may be about $5.5 \times 10^{-6}$ equivalent or less (e.g., about $0.01 \times 10^{-6}$ to $5 \times 10^{-6}$ equivalent), preferably about $3.5 \times 10^{-6}$ equivalent or less (e.g., about $0.01 \times 10^{-6}$ to $3 \times 10^{-6}$ equivalent) and more preferably about $2.5 \times 10^{-6}$ equivalent or less (e.g., about $0.01 \times 10^{-6}$ to $2 \times 10^{-6}$ equivalent) in terms of ion equivalent. In particular, when the total content of an alkali metal and alkaline earth metal in 1 gram of a cellulose acetate is about $1.0 \times 10^{-6}$ equivalent or less (e.g., about $0.1 \times 10^{-6}$ to $0.5 \times 10^{-6}$ equivalent) and practically about $0.3 \times 10^{-6}$ equivalent or less (e.g., about $0.1 \times 10^{-6}$ to $0.3 \times 10^{-6}$ equivalent), the releasing resistance of a semi-dried film from a support after casting a dope containing such cellulose acetate on the support by casting process can be decreased on releasing.

Incidentally, the content of an alkali metal and alkaline earth metal in a cellulose acetate may be quantitated by an atom absorptiometric analysis.

Cellulose acetates of the embodiments (1) and (2) can be produced, for example, by mixing a cellulose acetate and an acid having the above acid dissociation exponent pKa or metal salt thereof, or treating a cellulose acetate with the acid or metal salt thereof. The mixing or treatment of a cellulose acetate with the acid or metal salt thereof may be carried out in any steps, for example, during or after the production step of a cellulose acetate (e.g., an adding step of heat stabilizer after hydrolysis or aging step). Moreover, the treatment with the acid or metal salt thereof may be carried out by washing, dipping or immersing of a cellulose acetate in the form of particle or flake. Further, the mixing or treatment may be carried out by adding the acid or metal salt thereof to a dope containing a cellulose acetate.

The mixing or treatment with the acid having the above acid dissociation exponent pKa or metal salt thereof may be carried out at a temperature not adversely affecting operatability, for example, about 10 to 70° C. (preferably about 15 to 50° C.). The mixing or treating time may be selected within a broad range of, for example, about 1 minute to 12 hours.

At least a part of carboxyl groups binding to a cellulose acetate and/or hemicellulose acetate can become in the form of a free acid by using the acid having such acid dissociation exponent pKa or metal salt thereof.

The cellulose acetate of the embodiment (3) can be produced, for example, in the production process of the cellulose acetate by reducing the addition amount of a heat stabilizer (an alkaline metal salt or an alkaline earth metal salt) to the cellulose acetate, or treating a cellulose acetate with the acid having the above acid dissociation exponent pKa or a metal salt thereof as described above.

The cellulose acetate of the embodiment (4), i.e. a cellulose acetate having a carboxyl group in the form of an acid (embodiment (1)) and containing the acid having a specific acid dissociation exponent pKa or a metal salt thereof (embodiment (2)) can be produced by incorporating the specific acid or metal salt thereof into a cellulose acetate by mixing (addition) or treatment to become at least a part of carboxyl groups binding to a cellulose acetate and/or hemicellulose acetate in the form of an acid (the formation of free carboxyl groups).

The cellulose acetate of the embodiment (5), i.e. a cellulose acetate having a carboxyl group in the form of an acid (free carboxyl groups; embodiment (1)) and containing the reduced content of an alkali metal or an alkaline earth metal (embodiment (3)) can be produced by adjusting the adductive amount of a heat stabilizer (an alkali metal salt or an alkaline earth metal salt) to a cellulose acetate, mixing the salt of the acid having pKa mentioned above (a salt of an alkali metal or an alkaline earth metal) to a cellulose acetate, or treating a cellulose acetate with the metal salt of the acid.

The cellulose acetate of the embodiment (6), i.e. a cellulose acetate containing the acid having such acid dissociation exponent pKa or metal salt thereof (embodiment (2)) and having the reduced content of an alkali metal or an alkaline earth metal (embodiment (3)) can be produced by (i) adjusting the adductive amount of the acid having the specific pKa or metal salt thereof, or (ii) adjusting the adductive amount of the acid having the specific pKa or metal salt thereof, and of an alkali metal and/or an alkaline earth metal.

The cellulose acetate of the embodiment (7), i.e., a cellulose acetate having a carboxyl group in the form of an acid (embodiment (1)), containing the acid having such acid dissociation exponent pKa or metal salt thereof (embodiment (2)), and decreasing the content of an alkali metal or an alkaline earth metal (embodiment (3)) can be produced by (i) adjusting the adductive amount of the acid having the specific pKa or metal salt thereof by means of mixing (adding) or treatment, or (ii) adjusting the adductive amount of the acid having the specific pKa or metal salt thereof, and of an alkali metal and/or an alkaline earth metal.

Such cellulose acetates have high releasability from a support in the production of a film by casting process, and improve a film-forming speed and productivity of a cellulose acetate film. Moreover, a cellulose acetate is superior in optical characteristics such as transparency. The transparency of a cellulose acetate is, for example, about 60 to 100% (preferably about 70 to 100%, and more preferably about 75 to 100%) and practically about 70 to 90%. The haze of the cellulose acetate is, for example, about 1 to 8 (preferably about 1 to 5). Further, the yellowness index (YI), which is an indicator of yellowness of a cellulose acetate, is for example, about 1 to 10 (preferably about 1 to 7 and practically about 2 to 5).

The transparency, haze, and yellowness index (YI) may be determined as follows.

[Transparency]

Weigh exactly 8.0 g of cellulose acetate, previously dried, add 125.3 g of a solvent (e.g., a mixture of methylene chloride-methanol (9:1, w/w) or acetone), and effect thorough dissolution (sample solution having a concentration of 6% (by weight)).

Using an AKA photoelectric colorimeter equipped with a cesium photoelectric tube and a filter No. 12, put the solvent in the glass cell with a light path length of 100 mm and measure the blank transmittance. Then, put the 6% (by weight) sample solution in the glass cell with a light path length of 100 mm and measure its transmittance. With the blank transmittance value being taken as 100%, the percentage of the transmittance value of the sample solution is recorded as the transparency of the sample.

[Haze]

Weigh exactly 12.0 g of cellulose acetate, previously dried, add 88.0 g of a solvent (e.g., a mixture of methylene chloride-methanol (9:1, w/w) or acetone), and effect thorough dissolution (sample solution having a concentration of 12% (by weight)).

Using a turbidimeter (Nippon Denshoku Kogyo Co., Ltd.) and a glass cell (45 mm wide, 45 mm high, light path length 10 mm), perform measurements as follows.

Put the solvent in the glass cell, set the cell in the turbidimeter, and perform zeroing and calibration. Then, put the 12% (by weight) sample solution in the glass cell, set the cell in the turbidimeter, and record the reading.

[Yellowness Index (YI)]

Weigh exactly 12.0 g of cellulose acetate, previously dried, add 88.0 g of a solvent (e.g., a mixture of methylene chloride-methanol (9:1, w/w) or acetone), and effect thorough dissolution (a solution in a concentration of 12% by weight). Using a color difference meter (Nippon Denshoku Kogyo Co., Ltd., Color Difference Meter 90) and a glass cell (45 mm wide, 45 mm high; light path length 10 mm), perform measurements and calculate YI by means of the following equation.

$$YI = YI_2 - YI_1$$

wherein $YI_1$ represents YI for the solvent, and $YI_2$ shows YI for the 12% (by weight) sample solution.

Further, the above cellulose acetates have a high solution stability, filterability and spinnability, and thus remarkably reduce the frequency of thread breakage in a continuous spinning for a long time.

Furthermore, a cellulose acetate, which have high releasability, excellent optical characteristics and spinnability as well as high thermal-stability, can be obtained by adjusting a flake slurry pH to 4.5 to 6.0 with the acid or salt thereof according to the present invention.

The slurry pH is determined as follows.

[Slurry pH]

Weigh exactly 2.0 g of cellulose acetate, previously dried in the form of minute powder, add 80 ml of a boiled distilled water, stir and seal. After standing over night, the mixture is stirred and precipitated. As the sample solution, about 10 ml of supernatant is obtained, and measured pH of the sample solution by means of pH meter corrected. As blank pH, the pH of the boiled distilled water is measured. The hydrogen ion concentration $[H^+]_s$ and $[H^+]_b$ (s: sample solution, b: blank solution) of the sample solution and the blank solution are calculated respectively by means of the calculation equation $[H^+] = 10^{-(pH)}$ (pH represents a pH value measured). In the case of $[H^+]_s \geq [H^+]_b$, the slurry pH may be calculated by the following formula:

$$\text{slurry pH} = -\log([H^+]_s - [H^+]_b)$$

In the case of $[H^+]_s < [H^+]_b$, the hydroxyl group ion-concentration $[OH^-]_s$ and $[OH^-]_b$ of the sample solution and the blank solution are calculated respectively by means of the calculation equation $[OH^-] = 10^{-14} \div [H^+]$. The slurry pH may be calculated by the following formula:

$$\text{slurry pH} = 14 + \log([OH^-]_s - [OH^-]_b + 10^{-7})$$

The cellulose acetate can be produced by adjusting the concentration of the acid and/or salt thereof in the treatment step (washing or dipping step) of cellulose acetate (e.g., cellulose acetate in the form of particulate or flake) and adjusting the pH of the aqueous slurry solution (or an aqueous phase). Incidentally, the "treatment" may be carried out in any steps during or after the production of cellulose acetate.

The cellulose acetate of the present invention having such characteristics is useful for the production of a film or fiber by using the solution (dope) containing the cellulose acetate. (I) The dope of the present invention contains at least one cellulose acetate of the above embodiments (1) to (7). (II) The another dope of the present invention contains (a) a cellulose acetate and (b) at least one member selected from an acid having a acid dissociation exponent pKa of 1.93 to 4.50 in water, an alkaline metal salt of the acid and an alkaline earth metal salt of the acid. In the latter dope (II), (a) cellulose acetate may be any cellulose acetates of the embodiments (1) to (7), or other cellulose acetates than the cellulose acetates of the embodiments (1) to (7). That is, the other cellulose acetate wherein a carboxyl group binding to cellulose acetate and/or hemicellulose acetate is not in the form of acid but salt (an alkali metal salt, an alkaline earth metal salt), or a cellulose acetate containing the total content of an alkali metal and an alkaline earth metal is more than $5.5 \times 10^{-6}$ equivalent per 1 gram in the term of ion equivalent) may be used. The average degree of acetylation or the degree of polymerization of such cellulose acetate may be selected within the range similar to that of the cellulose acetate of the present invention.

The dope usually comprises a cellulose acetate and a solvent (an organic solvent). The solvent mentioned above may be selected according to the average degree of acetylation of the cellulose acetate and other facters, and include, for example, halogenated hydrocarbons (e.g., methylene chloride, ethylene chloride), ketones (e.g., acetone, methyl ethyl ketone, methyl isobutyl ketone, cyclohexanone), esters (e.g., formic acid esters such as ethyl formate, acetic acid esters such as methyl acetate and ethyl acetate, ethyl lactate), ethers (e.g., dioxane, dimethoxyethane), cellosolves (e.g., methylcellosolve, ethylcellosolve), cellosolve acetates (e.g., methylcellosolve acetate, ethylcellosolve acetate), and a mixture of such solvents. The solvent may contain nitro compounds (e.g., nitromethane, nitroethane, nitropropane) and/or lower alcohols (e.g., methanol, ethanol, isopropanol, butanol, diacetone alcohol).

The amount of the solvent can be selected from the range not adversely affecting castability in the forming of a film, spinnability and handleability. Thus, based on 100 parts by weight of cellulose acetate, the solvent can be used in a proportion of, for example, about 150 to 1000 parts by weight (cellulose acetate concentration of about 10 to 40% by weight), preferably about 200 to 900 parts by weight (cellulose acetate concentration of about 10 to 30% by weight). The concentration of the cellulose acetate in the dope is usually about 10 to 25% by weight (for example, 10 to 20% by weight).

The dope thus obtained is useful for forming or molding of film by a casting process. In the film-formation, a cellulose diacetate or a cellulose triacetate (in particular a cellulose triacetate) is usually used. The film is prepared by casting a dope on a support, and after partial drying (semi-drying), the film is released from the support. The released film is then dried to form a film.

The support may be any of the conventional supports, for example a mirror-finished or specular metal support (e.g., a stainless steel support).

Since the cellulose acetate of the present invention has excellent releasability, the film in semi-dry state (semi-dried film) can be smoothly released from the support, with the result that a cellulose acetate film with a high degree of surface smoothness can be provided. Therefore, the method with use of the dope of the present invention is useful for improving releasability of a film from a support. Moreover, the cellulose acetate film of the present invention is outstanding in optical characteristics (yellowness, haze, and transparency).

The thickness of the cellulose acetate film can be selected according to the intended application, for example from the range of about 5 to 500 μm, preferably about 10 to 200 μm, and more preferably about 20 to 150 μm (50 to 150 μm in particular).

The cellulose acetate of the present invention is not only useful for the production of photographic film, polarizer protective film or color filter film by the casting technique but can be used, by taking advantage of its good releasability, as a material for the production of a thin-optical film or device by, for example, the spin coating technology.

The cellulose acetate of the present invention is superior in stability, filterability and spinnability of the dope as described above. When a fiber is produced by spinning process, a cellulose diacetate or a cellulose triacetate is usually used as a cellulose acetate. The spinning process may be carried out by a conventional method, for example, by spinning a dope from a base having many fine holes and drying the spinning yarns or threads, and if necessary, drawing or stretching the fibers. The use of the dope of the present invention in the spinning process may prevent clogging or choking of the holes or thread breakage for a long time. Therefore, the method with use of the dope of the present invention is useful for improving spinnability.

The cellulose acetate or the dope of the present invention may contain one or more plasticizers including, for example, phosphoric acid esters such as triphenyl phosphate (TPP), tricresyl phosphate (TCP), etc.; phthalic acid esters such as dimethyl phthalate (DMP), diethyl phthalate (DEP), dibutyl phthalate (DBP), dioctyl phthalate (DOP), di-2-ethylhexyl phthalate (DEHP), etc.; fatty acid esters such as butyl oleate, methyl acetyl ricinolate, dibutyl sebacate, etc.; citric acid esters such as acetyl triethyl citrate (OACTE), acetyl tributyl citrate (OACTB), etc.; trimellitic acid esters, and so forth. These plasticizers can be used singly or in combination.

The cellulose acetate may further contain aging inhibitors such as an antioxidant, an ultraviolet absorber, a peroxide decomposer, a radical scavenger, a metal deactivator or sequesterant, an acid acceptor, and other additives. Where necessary, the cellulose acetate may contain such other additives as a nucleating agent, an inorganic powder (e.g., diatomaceous earth, calcium carbonate, titanium dioxide), a thermal stabilizer, a flame retardant, and a coloring agent.

By using the cellulose acetate (cellulose acetate having a free carboxyl group, cellulose acetate containing a specific acid or salt thereof, cellulose acetate having a reduced content of an alkali metal salt and alkaline earth metal salt) of the present invention, it is easily releasable from the support in a casting process to provide a film with a high surface smoothness and excellent optical characteristics. Moreover, the cellulose acetate of the present invention is superior in stability, filterability and spinnability of the dope and high thermal resistance.

EXAMPLES

The following examples are intended to describe this invention in further detail and should by no means be interpreted as defining the scope of the invention.

Incidentally, the releasability of the film from support in the casting process was evaluated as follows.

One-hundred (100) parts by weight of cellulose acetate was mixed with 320 parts by weight of methylene chloride, 40 parts by weight of methanol, 25 parts by weight of butanol, and 15 parts by weight of triphenyl phosphate (TPP) to prepare a dope. This dope was cast on a smooth stainless steel plate (support) in a thickness of about 1 mm at room temperature (about 20 to 25° C.) and allowed to stand at room temperature for 3 to 4 minutes. Then, the releasability of the film from the support was evaluated in according to the following criteria.

○: Smoothly released with a minimum of peel drag and the film surface was smooth.

X: Not smoothly released but a considerable peel drag was felt, film peelings remain on the stainless steel plate.

Comparative Example 1

One-hundred (100) parts by weight of a hardwood kraft pulp (α-cellulose content 94.5%) was sprayed with 50 parts by weight of glacial acetic acid for activation. Then, a mixture of 470 parts by weight of glacial acetic acid, 265 parts by weight of acetic anhydride, and 8.3 parts by weight of sulfuric acid was added to the activated mixture, and the esterification reaction was carried out in the conventional manner. Thereafter, the hydrolysis reaction was carried out, and a thermal stabilizers (calcium acetate and magnesium acetate) were added to the resultant hydrolyzate to provide a cellulose triacetate (CTA, a degree of acetylation of 61.3% and a viscosity average degree of polymerization of 301 (calcium content of 98 ppm ($4.9 \times 10^{-6}$ ion equivalent), magnesium content of 16 ppm ($1.3 \times 10^{-6}$ ion equivalent)). This CTA had a YI of 7.1, a haze value of 2.6, and a transparency of 78%.

The resulting CTA was used to prepare a dope. When the releasability of the film in the spinning process was evaluated, the rating was "x".

Examples 1 and 2, and Comparative Example 2

To citric acid solutions having different concentration each other, 50 g of the resulting CTA flakes obtained in Comparative Example 1 were added. The each mixture was stirred for 1 hour at room temperature (20 to 25° C.) and dipped for treatment of the CTA with citric acid. The CTA flakes were filtrated off, washed with water and vacuum dried to produce CTA flakes containing the following content of citric acid per 1 gram.

Example 1: the citric acid content of $7.7 \times 10^{-7}$ mole, YI 7.0, haze value 2.2, transparency 85%

Example 2: the citric acid content of $6.8 \times 10^{-8}$ mole, YI 7.0, haze value 2.4, transparency 81%

Comparative Example 2: the citric acid content of $5.5 \times 10^{-9}$ mole, YI 7.1, haze value 2.6, transparency 75%

The resulting CTA flake treated with citric acid was used to prepare a dope in the same manner as in Comparative Example 1. When the releasability of the film in the casting process was evaluated, the rating of Examples 1 and 2 was "○", and the rating of Comparative Example 2 was "x".

Example 3

To 97 g of the dope prepared by Comparative Example 1 (the content of CTA 19.4 g), 11.8 mg of citric acid was added and mixed to produce a dope containing citric acid. Using this dope, when the releasability of the film in the casting process was evaluated as the same manner as in Comparative Example 1, the rating was "○".

Example 4

Using the CTA flake obtained in Comparative Example 1, a dope was prepared as in Comparative Example 1. To 97 g of the dope (the content of CTA 19.4 g), 35.3 mg of calcium citrate·4H$_2$O was added and mixed to produce a dope containing the citric acid salt. Using this dope, when the releasability of the film in the casting process was evaluated as the same manner as in Comparative Example 1, and the rating was "○".

Comparative Example 3

One-hundred (100) parts by weight of a hardwood kraft pulp (α-cellulose content 94.5%) was sprayed with 50 parts by weight of glacial acetic acid for activation. Then, a mixture of 445 parts by weight of glacial acetic acid, 265 parts by weight of acetic anhydride, and 8.3 parts by weight of sulfuric acid was added to the activated mixture, and the esterification reaction was carried out in the conventional manner. Thereafter, the hydrolysis reaction was carried out to provide, without adding a thermal stabilizer (calcium acetate and magnesium acetate), a cellulose triacetate with a degree of acetylation of 60.8% and a viscosity average degree of polymerization of 313 (CTA, calcium content of 0 ppm, magnesium content of 7.3 ppm ($0.61 \times 10^{-6}$ ion equivalent), the sodium content of 0 ppm per 1 gram). This CTA had a YI of 3.5, a haze value of 2.7, and a transparency of 78.2%.

Examples 5 to 7, and Comparative Examples 4 and 5

To calcium hydroxide solution, magnesium hydroxide solution or sodium acetate solutions which have different concentration each other, the flake of Comparative Example 3 was dipped for treatment. The each CTA flake was filtrated off and dried to produce CTA flake containing the following content of metal components per 1 gram. Incidentally, Ca, Mg and Na represent calcium, magnesium and sodium, respectively. The content of these metals per 1 gram CTA in the term of ion equivalent ($\times 10^{-6}$ equivalent) shows in parentheses.

Example 5: Ca content 10 ppm (0.5), Mg content 5.6 ppm (0.47), Na content 0 ppm

Example 6: Ca content 6.5 ppm (0.33), Mg content 22 ppm (1.8), Na content 0 ppm.

Example 7: Ca content 2 ppm (0.1), Mg content 4.3 ppm (0.36), Na content 53 ppm (2.3)

Comparative Example 4: Ca content 98 ppm (4.9), Mg content 16 ppm (1.3), Na content 0 ppm Comparative Example 5: Ca content 129 ppm (6.5), Mg content 93 ppm (7.8), Na content 0 ppm Using CTA treated with dipping as mentioned above, a dope was prepared and the releasability of the film was evaluated as in Comparative Example 1. As a result, the rating of Examples 5 to 7 were "○" and the rating of Comparative Examples 4 and 5 were "x".

When the slurry pH of Comparative Example 3, Examples 5 to 7 and Comparative Example 5 were determined, the resulting values were as follows.

Comparative Example 3: 4.26

Example 5: 4.51

Example 6: 4.83

Example 7: 5.03

Comparative Example 5: 6.45

When the releasability of cellulose acetates of Comparative Example 3, Examples 5 to 7 and Comparative Example 5 were evaluated, the ratings of Comparative Example 3 and Examples 5 to 7 were "○", and the rating of Comparative Example 5 was "x".

The heat resistance of cellulose acetates of Comparative Example 3, Examples 5 to 7 and Comparative Example 5 were evaluated in according to the following criteria.

○: when heated at 60° C. for drying, deterioration and discoloration are not observed x: when heated at 60° C. for drying, there was deterioration and discoloration Comparative Example 3 showed the heat resistance level "x", and Examples 5 to 7 and Comparative Example 5 showed the heat resistance level "○"

Example 8

One-hundred (100) parts by weight of a softwood sulfite pulp (α-cellulose content 94.5%) was sprayed with 50 parts by weight of glacial acetic acid for activation. Then, a mixture of 445 parts by weight of glacial acetic acid, 265 parts by weight of acetic anhydride, and 8.3 parts by weight of sulfuric acid was added to the activated mixture, and the esterification reaction was carried out in the conventional manner. Thereafter, the hydrolysis reaction was carried out and calcium acetate and magnesium acetate were added to the resulting hydrolysis to provide a cellulose triacetate with a average degree of acetylation of 61.3% and a viscosity average degree of polymerization of 310 (CTA, Ca content of 10 ppm ($0.5 \times 10^{-6}$ ion equivalent), Mg content of 5.3 ppm ($0.44 \times 10^{-6}$ ion equivalent) per 1 gram). This CTA had a YI of 6.6, a haze value of 2.0, and a transparency of 83%.

The releasability was evaluated as in Comparative Example 1, and the rating was "○".

Example 9 and Comparative Example 6

Except that a softwood sulfite pulp (α-cellulose content 96.1%) was used instead of the starting pulp used in Example 8, the esterification reaction was carried out in the same manner as Example 8. Thereafter, the hydrolysis reaction was carried out, and calcium acetate and magnesium acetate were added to the resultant mixture to provide a cellulose triacetate with a average degree of acetylation of 55.2% and a viscosity average degree of polymerization of 299 (CDA, the metal component content was represented as follows). The content of these metals per 1 g CDA in the term of ion equivalent ($\times 10^{-6}$ equivalent) represents in parentheses.

Example 9: the Ca content of 10 ppm (0.44), the Mg content of 6.2 ppm (0.52); a haze value of 1.9, transparency of 82.5%.

Comparative Example 6: the Ca content of 125 ppm (6.3), the Mg content of 18 ppm (1.5); a haze value of 6.3, transparency of 73%.

The CDA obtained by Example 9 and Comparative Example 6 was used to prepare 30% by weight of acetone solution (dope). When the spinnability of the dope was evaluated in according to the following criteria as the stability of the dope in the course of time, the ratings of CDA in Example 9 was "○", and the rating of CDA in Comparative Example 6 was "x".

○: the dope was stable for a long time, and when filtering, there was no choking of the holes.

x: the dope became white turbid, thus the stability of the dope lowered, and when filtering, there was choking of the holes

The invention claimed is:

1. A cellulose acetate which is soluble in an organic solvent and has a carboxyl group and a sulfonic acid group and contains alkali metal, alkaline earth metal, or both alkali metal and alkaline earth metal, wherein said cellulose acetate has the following feature (iii):

(iii) the alkali metal, the alkaline earth metal, or both alkali metal and alkaline earth metal is present in said cellulose acetate in an amount such that the total content of the alkali metal and the alkaline earth metal in 1 gram of the cellulose acetate is $0.01 \times 10^{-6}$ to $5.5 \times 10^{-6}$ equivalent in terms of ion equivalent, and a flake of said cellulose acetate has a pH of 4.5 to 6.0 in the form of a slurry.

2. The cellulose acetate according to claim 1, wherein the average degree of acetylation is from 58 to 62.5%.

3. The cellulose acetate according to claim 1, wherein said cellulose acetate is soluble in an organic solvent and insoluble in water.

4. The cellulose acetate according to claim 1, wherein a cellulose as a raw material of said cellulose acetate comprises at least a wood pulp.

5. The cellulose acetate according to claim 1, wherein a cellulose as a raw material of said cellulose acetate is at least one selected from a hardwood pulp and a softwood pulp.

6. A composition comprising a cellulose acetate that has a carboxyl group and a sulfonic acid group and contains alkali metal, alkaline earth metal, or both alkali metal and alkaline earth metal, wherein a flake of said composition or said cellulose acetate has a pH of 4.5 to 6.0 in the form of a slurry, and said composition or said cellulose acetate has the following feature (ii), (iiia), or (iiib):

(ii) said composition comprises said cellulose acetate and at least one member, selected from the group consisting of an acid having an acid dissociation exponent pKa of 1.93 to 4.50 in water, an alkali metal salt of said acid, and an alkaline earth metal salt of said acid, which is contained in a proportion of $1 \times 10^{-9}$ to $3 \times 10^{-5}$ mole relative to 1 gram of the cellulose acetate;

(iiia) the alkali metal, the alkaline earth metal, or both alkali metal and alkaline earth metal is present in said cellulose acetate in an amount such that the total content of the alkali metal and the alkaline earth metal in 1 gram of the cellulose acetate is $0.01 \times 10^{-6}$ to $5.5 \times 10^{-6}$ equivalent in terms of ion equivalent; or (iiib) said composition comprises said cellulose acetate and at least one member, selected from the group consisting of an acid having an acid dissociation exponent pKa of 1.93 to 4.50 in water, an alkali metal salt of said acid, and an alkaline earth metal salt of said acid, is contained in a proportion of $1 \times 10^{-9}$ to $3 \times 10^{-5}$ mole relative to 1 gram of the cellulose acetate, and the alkali metal, the alkaline earth metal, or both alkali metal and alkaline earth metal is present in said cellulose acetate in an amount such that the total content of the alkali metal and the alkaline earth metal in 1 gram of the cellulose acetate is more than $5.5 \times 10^{-6}$ equivalent (in terms of ion equivalent).

7. The cellulose acetate composition according to claim 6, which has a pH of 4.8 to 6.0 in the form of a slurry.

8. The composition according to claim 6, wherein a cellulose as a raw material of said cellulose acetate comprises at least a wood pulp.

9. The composition according to claim 6, wherein a cellulose as a raw material of said cellulose acetate is at least one selected from a hardwood pulp and a softwood pulp.

10. A dope comprising the cellulose acetate composition according to claim 6, and further comprising an organic solvent.

11. A dope containing cellulose acetate and an organic solvent, wherein the cellulose acetate is soluble in the organic solvent and has a carboxyl group and a sulfonic acid group and contains alkali metal, alkaline earth metal, or both alkali metal and alkaline earth metal, wherein said dope or said cellulose acetate has the following feature (iiib):

(iiib) the alkali metal, the alkaline earth metal, or both alkali metal and alkaline earth metal is present in said cellulose acetate in an amount such that the total content of the alkali metal and the alkaline earth metal in 1 gram of the cellulose acetate is more than $5.5 \times 10^{-6}$ equivalent (in terms of ion equivalent), and said cellulose acetate contains at least one member selected from the group consisting of an acid having an acid dissociation exponent pKa of 1.93 to 4.50 in water, an alkali metal salt of said acid, and an alkaline earth metal salt of said acid, in a proportion of $1 \times 10^{-9}$ to $3 \times 10^{-5}$ mole relative to 1 gram of the cellulose acetate.

12. A method for improving the releasability of a film from a support which comprises casting a dope of claim 11 on the support.

* * * * *